(12) United States Patent
Piesslinger

(10) Patent No.: US 8,802,228 B2
(45) Date of Patent: Aug. 12, 2014

(54) BLISTER TOP FOIL FOR BLISTER PACKS

(75) Inventor: Johannes Piesslinger, Bad Erlach (AT)

(73) Assignee: Constantia-Patz Ges.m.b.H., Loipersbach (AT)

( * ) Notice: Subject to any disclaimer, the term of this patent is extended or adjusted under 35 U.S.C. 154(b) by 1247 days.

(21) Appl. No.: 12/227,957

(22) PCT Filed: Jun. 4, 2007

(86) PCT No.: PCT/AT2007/000268
§ 371 (c)(1),
(2), (4) Date: Jan. 12, 2009

(87) PCT Pub. No.: WO2007/140499
PCT Pub. Date: Dec. 13, 2007

(65) Prior Publication Data
US 2009/0311525 A1    Dec. 17, 2009

(30) Foreign Application Priority Data

Jun. 2, 2006  (EP) ..................................... 06450078

(51) Int. Cl.
*B32B 5/00* (2006.01)
*B32B 7/12* (2006.01)
*B32B 15/20* (2006.01)

(52) U.S. Cl.
USPC .......................................... 428/339; 428/349

(58) Field of Classification Search
None
See application file for complete search history.

(56) References Cited

U.S. PATENT DOCUMENTS

| 4,172,914 | A  | * | 10/1979 | Festag et al. ................. 428/35.9 |
| 2003/0186032 | A1 | * | 10/2003 | Rosenberger et al. ..... 428/195.1 |
| 2004/0062887 | A1 |   | 4/2004 | Quinn et al. |
| 2006/0283758 | A1 | * | 12/2006 | Pasbrig ......................... 206/531 |
| 2007/0068842 | A1 | * | 3/2007 | Pasbrig ......................... 206/532 |

FOREIGN PATENT DOCUMENTS

| DE | 39 28 712 | 3/1990 |
| EP | 0 657 277 | 6/1995 |
| EP | 1 468 817 | 10/2004 |
| EP | 1 468 935 | 10/2004 |

* cited by examiner

*Primary Examiner* — Callie Shosho
*Assistant Examiner* — Cheng Huang
(74) *Attorney, Agent, or Firm* — Lucas & Mercanti, LLP; Klaus P. Stoffel

(57) ABSTRACT

The invention relates to a blister top foil for sealing with respect to an existing blister bottom foil, wherein the blister top foil comprises at least the following layers, seen from the outside to the inside of the finished pack: possibly a layer of printing undercoat lacquer (c), a layer of printing primer (d), a layer of adhesive (e), a layer of plastic film (f), a layer of possibly peelable adhesive (g), a layer of aluminum (h) and a layer of heat sealing lacquer (i). The invention is characterized in that the printing primer layer (d) is an aluminum layer.

8 Claims, No Drawings

BLISTER TOP FOIL FOR BLISTER PACKS

The invention relates to a blister top foil for a blister packaging material, wherein the blister top foil includes at least the following layers as seen from the outside toward the inside of the finished packaging material: a printing primer layer, an adhesive layer, a layer of adhesive foil, a layer of possibly peelable adhesive, a layer aluminum and a layer of heat sealing lacquer. In many cases, the outermost layer is a layer of printing primer lacquer, however, there are cases in which this layer coincides with the primer layer or is not necessary because of the printing technology.

Blister packaging materials of the above-described type as they are known, for example, from EP 1 468 817 A, meet various requirements for so-called child-proof and senior-friendly packaging materials, as they are used especially for medicaments.

Blister packaging materials have been known for a long time. They are composed of a so-called blister bottom foil in which cups are formed thermally or by cold deformation, and into which the powder, pills, capsules, etc are placed subsequently, and a nontransparent, usually imprinted blister top foil, frequently also called blister foil for short. The simplest blister packaging materials have blister bottom foils which are transparent and blister top foils through which the contents can be forced by ripping the blister top foils.

A good overview over more complex blister packaging materials can be found in EP 1 468 817 A, which has already been mentioned, and EP 1 468 935 A, whose contents are incorporated herein by reference. US 2004/0062887 A discloses the use of metallized paper as a material for blister packaging materials.

Moreover, EP 657 277 A, which pertains to a completely different technical field, namely multi-layered, laminar structures which absorb oxygen and which are placed in the interior of packaging materials for foodstuffs which are being prepared by means of microwaves, indicates that one of the layers, the separating layers which in these structures generally are of paper, can also be of plastics material or metal in order to avoid paper dust.

There are different further developments of the above-described basic configuration of the blister packaging materials, as they are partially also disclosed in EP 1468 817 A and EP 1 468 935 A. Among these further developments are nontransparent blister bottom foils for protecting the packaged objects against the admission of light, but also prevent the objects from being optically displayed to children, so that children are not induced to manipulating the packaging material or its contents; other further developments are the construction of blister packaging materials which are suitable for the tropics and the like.

A further development which has been used increasingly but not exclusively, especially in the United States, for several years is the above-mentioned configuration of so-called child-proof but senior-friendly packaging materials. They are packaging materials in which the blister bottom foil as well as the blister top foil are so stable that it is not possible to force the contents through the foil or to bite through the foil as long as no other measures have been taken previously, wherein, however, the requirements are based on the assumption that these measures can be carried out by seniors, but not by children. These measures are based on the fact that in these blister packaging materials the blister top foil is constructed with a greater thickness and the part of the foil arranged on the outside as seen from the packaged material has such a mechanical strength that it is difficult to force the contents through the foil. Consequently, for this purpose, a portion of the blister top foil, i.e., the safety layer, must be peeled off before it is possible to have access to the contents, and only subsequently the part of the blister top foil remaining on the packaging material, i.e., the contents layer, is punched through by the material.

Moreover, an additional safety measure is incorporated by making it possible to peel the safety layer only from areas of the blister top foil which in the packaging material new from the factory is located in the interior of the surface area having several blisters, so that these packaging materials are partitioned along intended breaking points into individual blisters, so that the safety layer located at the outside can then be peeled off and the inner blister top foil, the contents layer, can only then be pierced by the contents by pressing in the blister foil and the contents can then be used in accordance with their purpose.

There is one other type of blister packaging material, namely those for objects which are mechanically sensible or instable and would be damaged or even destroyed if they were used as a tool for piercing the blister top foil. A blister top foil is used for these materials which essentially is constructed in such a way as it is described above with respect to the blister top foil, wherein, however, the safety layer cannot be pulled off from the contents layer because of the use of an appropriately strong adhesive or bonding agent. This provides the possibility in a manner which is also known to pull off the entire blister top foil from the blister bottom foil after a individual blister has been separated and to provide access to the packaged goods in this manner.

In both cases, with the only difference of the used adhesive or bonding agent between the safety layer and the substance layer of the blister top foil, the construction of the finished packaging material is generally the following as seen from the outside toward the inside, wherein, however, additional layers may also be present:

a) a protective printing layer
   b) a printing layer,
   c) possibly printing undercoat lacquer
   d) a paper layer forming the printing primer
   e) a layer of adhesive or bonding agent
   f) a plastic foil particularly polyester, polyamide, etc,
   g) a layer of peelable or non-peelable adhesive or bonding agent,
   h) an aluminum layer or foil,
   i) a layer of heat-sealing lacquer Foil manufacturers produce the assembled layers from the possibly provided printing undercoat lacquer c) to the heat sealing lacquer i) as a prefabricated product and deliver them in this form for printing and filling or after printing. The layers c) or d) to f) form the safety layer, the layers h) and i) the substance layer and the adhesive layer g) can be assigned as desired to none, to one or both layers. Since the printing undercoat lacquer if present is applied by the foil manufacturer, it is included in the present application and specification as being one of the coat layers which are "at least present" which is then rendered relative by the addition "possibly". It is only in the claims that this description which is logical with respect to the manufacturing method is replaced by a definition which is more easily to understand. The importance and objects of the individual layers of the initial product are in short the following:

Ad c) The printing undercoat lacquer provides a surface which is standardized and favorable for printing, but can possibly be omitted in modern printing systems;

Ad d) The paper layer forms the basic layer for printing, and the paper layer contributes to increasing the strength;

Ad e) The adhesive or bonding agent serves for connecting to

Ad f) the plastics material which preferably is a polyester or polyamide foil and which provides especially the mechanical stability for providing "child safety";

Ad g) In a blister packaging material intended for forcing through the contents, the adhesive layer is peelable or it is non-peelable in a blister packaging material which is to be opened completely;

Ad h) The aluminum foil serves to completely surround the substance, is impermeable to light, steam and water and can still be mechanically damaged sufficiently in order to be able to be pierced by the substance, in accordance with the first embodiment of the blister packaging materials;

Ad i) The heat sealing lacquer only has the purpose of connecting the blister top foil with the blister bottom foil when finishing the already filled packaging material.

The foils or packaging materials constructed in this manner have been known for a longer time from the references mentioned above and from practical use they still have two types of deficiencies in spite of being distributed worldwide:

When the blister top foil is sealed to the blister bottom foil, the sealing heat must be supplied from the side of the blister top foil and this causes the paper layer to form a type of insulation which slows the flux of heat and makes it necessary to use longer sealing times or higher sealing temperatures. This is disadvantageous, on the one hand, because of the desired high production cycles and, on the other hand, because of the fact that there are numerous goods to be packaged which do not endure the thermal loads or only poorly endure the thermal loads. It is generally known that especially many medicaments are harmed under the influence of increased temperatures, particularly if these higher temperatures act for a longer period of time.

A second disadvantage of the foil in accordance with the prior art occurs also when the packaging material is finalized: By separating the units which usually contains 6, 8, 12, 24 or a similar number of cups from the endless material, inevitably paper dust, lint, fibers, etc. are released which, in spite of all safety precautions such as suction means, separating means, etc., may also find their way into the areas of the filling and packaging stations in which the individual deformed cups of the blister packaging material are still open, so that such dusts and fibers are sometimes sealed in together with the actual substance in such a blister packaging material and may reach the consumer, usually the patient.

Considering that the manufacture of the entire packaging material, including the printing process, must take place in clean rooms whose specifications are only slightly below those of clean rooms for the manufacture of medicaments to be packaged, the above-described disadvantage is upsetting to the consumer and undesirable for the manufacturer of the medicaments.

Therefore, it is the object of the invention to provide a packaging material of the above-described type which does not have the disadvantageous described above.

In accordance with the invention, the above object is met by integrating an aluminum foil instead of the paper layer into the blister top foil which is otherwise of the same construction. This does not make necessary a change of the manufacturing process and it is possible to use the same apparatus and devices as in the past and, particularly importantly, no changes are made on the side of the top foil which faces toward the packaged goods. It must be taken into consideration in this connection that each foil of this type is specifically registered for use with certain groups or classes of medicaments.

With respect to EP 657 277 A it is to be mentioned that the simple statement made in two lines of this reference could not have been found or used without knowing the invention because the technical fields are completely different.

By using an aluminum foil, preferably of soft aluminum having a thickness of about 0.015 mm, the problems of the formations of fibers when the packages are finalized are completely avoided and the heat transfer during heat sealing is significantly improved so that the cycle times can be increased as well as the thermal load on the objects to be packaged can be reduced. Because of the use of printing underground lacquer adapted to aluminum, there is also no change in the properties for printing on the outer side of the blister top foil.

In connection with the term soft aluminum it should be mentioned that this includes especially aluminum in the form of foils in which structural changes due to rolling, which result in an increase of the hardness, are treated by a thermal treatment which results in a recrystallization. A foil in which such a thermal treatment is not carried out is usually called hard aluminum; an incomplete thermal treatment (shorter treatment time, and thus only partially raised structural changes) result in a so-called semi-hard aluminum. The transitions are not fixed, i.e., they are not standardized, however, these terms are conventionally used and understandable in connection with the manufacture and use of aluminum foils.

Particularly favorable results are achieved with a blister top foil in which the printing undercoat lacquer c) is applied with a median application weight of 1.5 g/m$^2$. The top foil is preferably of nitrocellulose, urea resin and acrylic resin and is free of softeners. Variations on the basis of acrylic lacquer systems, for example, of the companies Trüb or DSM, are also possible.

The aluminum layer d) used in accordance with the invention is composed of a so-called soft aluminum, an alloy with at least 98.0 percent by weight aluminum according to EN 573. This alloy is approved for use by the relevant agencies and standards in most countries of the world, amongst them Austria, Germany, France and the United States of America for the use in connection with foodstuffs or medicaments.

A single or two-component adhesive is used as the adhesive or bonding agent of the layer e) which is also approved in most jurisdictions of the world for such purposes.

The plastic foil f) is preferably of polyester or polyamide with a thickness of 0.012-0.025 mm and is also safe with respect to the standpoint of approval.

The peelable or non-peelable plastic layer g), as well as the subsequent aluminum layer h), are constructed in accordance with the prior art and, therefore are usually accessible to the expert.

The same is true for the heat sealing lacquer i) which is preferably used with an application quantity of about 3.0-8.0 g/m$^2$.

The values described above are only to be considered examples and can be varied in relatively wide limits in accordance with available machines and the purpose of use thereof, i.e., especially the properties and the size of the goods being packaged.

The invention can be used in all blister top foils known in the prior art, particularly the childproof blister top foils, and especially in the foils used in all printed products mentioned above.

The invention claimed is:

1. Blister top foil for sealing against an existing blister bottom foil, wherein as seen from an outside toward an inside of a finished packaging material, the blister top foil has at least the following layers: an aluminum printing undercoat layer (d), an adhesive layer (e), a layer of plastic foil (f), a layer of peelable adhesive (g), a layer of aluminum (h) and a layer of heat sealing lacquer (i), wherein, the printing undercoat layer (d) is an aluminum layer.

2. Blister top foil according to claim 1, wherein, the aluminum printing undercoat layer (d) is of aluminum having a thickness of between 0.008 and 0.030 mm.

3. Blister top foil according to claim 1, wherein, the aluminum printing undercoat layer (d) is of soft aluminum.

4. Blister top foil according to claim 1, wherein, the aluminum printing undercoat layer (d) comprises a layer of printing undercoat lacquer (c).

5. Blister top foil according to claim 4, wherein, the printing undercoat lacquer (c) is applied with a median application rate of 1.5 q/m$^2$.

6. Blister top foil according to claim 4, wherein, the printing undercoat layer (c) is of nitrocellulose, urea resin or acryl resin, and is free of softeners.

7. Blister top foil according to claim 4, wherein, the printing undercoat lacquer (c) is based on acryl lacquer.

8. Blister packaging material composed of a blister bottom foil and a blister top foil, wherein, the blister top foil corresponds to claim 1.

\* \* \* \* \*